United States Patent Office 3,342,882
Patented Sept. 19, 1967

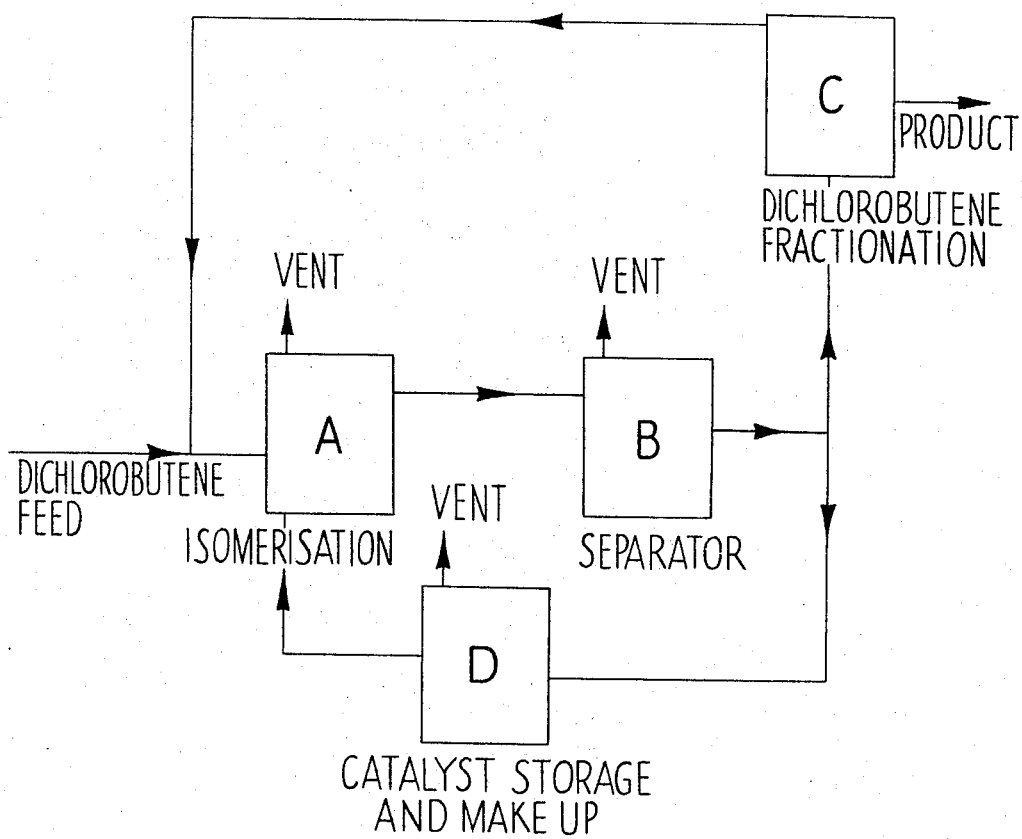

3,342,882
ALLYLIC REARRANGEMENT OF DICHLOROBUTENES
Winston Costain and Bernard William Hugh Terry, Manchester, England, assignors to Imperial Chemical Industries Limited, London, England, a corporation of Great Britain
Filed May 22, 1964, Ser. No. 369,567
Claims priority, application Great Britain, May 24, 1963, 20,891/63
8 Claims. (Cl. 260—654)

The invention relates to the allylic rearrangement of dichlorobutenes.

The allylic rearrangement of 1,4-dichlorobutene-2 and 3,4-dichlorobutene-1 may be represented by

The prior art suggests that this isomerisation proceeds to an equilibrium condition containing 15%–20% of 3,4-dichlorobutene-1 and 80%–85% of 1,4-dichlorobutene-2 although the proportionation is dependent on the isomerisation conditions. The prior art isomerisation methods, for example isomerisation at less than 50° C. in the presence of zinc chloride, ferric chloride, titanium tetrachloride or aluminium chloride or by isomerisation at about 120° C. in absence of a catalyst, do not always give satisfactory results because of degradative side reactions. Such processes are further described in U.K. Patent No. 505,573 and U.S. Patents Nos. 2,242,084 and 2,422,252. Thus U.S. Patent No. 2,422,252 discloses the use of a copper contact material at about 175° C. for reaction times of 2 to 4 hours. Other methods of isomerisation are known for example by the use of copper catalysts with organic amines at approximately 80° C., as further described in U.K. Patents Nos. 798,889 and 800,787. This latter method presents some difficulty in separation of the catalyst and bases if it is desired to operate the process continuously. More recent processes have been disclosed which involve the use of titanium fluoride and zirconium fluoride at temperatures of 120–150° C. but in these processes a very careful selection of the catalyst particle size must be made in order to obtain successful results. The use of chlorocuprous acid as catalyst at lower temperatures has also been proposed in which the isomerisation reaction is carried out in concentrated hydrochloric acid, but processes of this kind usually necessitate the use of glass lined or enamelled equipment because of the serious corrosion problem.

It has now been found that the dichlorobutenes can be isomerised by contacting them with an aqueous solution of alkali metal halide or ammonium halide or cupric halide containing a cuprous salt such as cuprous chloride. Development of acidity in the catalyst solution during isomerisation may advantageously be controlled by the addition of a buffer salt or acid binding agent to the system conveniently before isomerisation is commenced or during isomerisation.

Thus according to the present invention we provide a process for the isomerisation of dichlorobutenes separately or in admixture wherein the dichlorobutenes are contacted with an aqueous solution of an alkali metal halide or an ammonium halide or cupric halide containing a cuprous salt, the solution preferably being maintained at a pH value of from 3 to 7.3 by addition of a buffer salt and/or acid binding agent.

Although any alkali metal halide or ammonium halide or cupric halide may be used in the process we prefer to use sodium chloride, ammonium chloride or cupric chloride. Our preferred cuprous salt is cuprous chloride, but other cuprous salts such as cuprous bromide may be used if desired.

Usually the alkali metal halide, ammonium halide or cupric halide is present in solution in an amount of from 10% to 45% by weight the upper limit being determined by solubility. The cuprous salt dissolves at least partially in the alkali metal halide, ammonium halide or cupric halide solution and is usually present in an amount of from 0.5% to 10% by weight of the solution whether in the dissolved form or only partially dissolved. It is found convenient to employ from 0.025 to 0.75 mol. cuprous salt per mol. of dichlorobutene contacted.

The buffer salt when this is present in preferably selected from any of those known in the art as useful for maintaining pH values in the range 3.0 to 7.3. Sodium acetate and ammonium acetate are especially useful, but other substances such as cupric acetate may also be used. The buffer salt is preferably employed in an amount of at least 0.25 mol. buffer per mol. dichlorobutene treated per pass, and if the catalyst solution is recycled for further use it may be necessary to add additional buffer salt to maintain the desired pH level. Other additions having acid binding ability may be used to control acidity in the catalyst solution or to inhibit development of acidity if this is desired, for example sodium hydroxide, copper carbonate and hydrated copper oxide have been found particularly useful.

A typical catalyst solution may be prepared by making an aqueous solution or for example sodium chloride and agitating this with finely divided cuprous chloride to saturate the solution with dissolved cuprous chloride. Addition of buffer salt or other additive may then be made if desired. During the isomerisation the catalyst solution may be passed over or through a bed of metal copper to maintain the cuprous chloride in the reduced condition or metallic copper may be kept in permanent contact with the catalyst solution.

The dichlorobutene is preferably contacted in the liquid phase with the catalyst solution by dispersing the dichlorobutene in the form of fine liquid drops in the catalyst solution and after a suitable period of contact conveniently from 5 minutes to 60 minutes separating the substantially immiscible dichlorobutene product from the aqueous solution by gravity settling and decantation or by centrifuging. The catalyst solution may then be reused if desired and the process is found to be very adaptable to continuous operation.

The process may be conducted at atmospheric pressure or any pressure which may be convenient, at any temperature between the freezing and boiling points of the reactants, but is conveniently performed between temperatures of about 20° C. to about 60° C. Where the final purification of the isomerised product is performed by vacuum distillation it may also be convenient to conduct the isomerisation step at diminished pressure. The reaction proceeds in presence of oxygen but it is preferable to exclude oxygen so as to maintain the cuprous salt content of the catalyst in the reduced state.

Dichlorobutenes which can be isomerised are, for example 3,4-dichlorobutene-1, 1,4-dichlorobutene-2 and their mixtures.

The present process enables trans 1,4-dichlorobutene-2, essentially free from the cisisomer, to be obtained by isomerising 3,4-dichlorobutene-1 under the described conditions and fractionally distilling the product to free it from unchanged 3,4-dichlorobutene-1.

The process of the invention is illustrated in the accompanying flow sheet which represents a continuous process for the isomerisation of dichlorobutenes which has operated satisfactorily and maintaining for long period the desired conversion of chlorobutenes.

With reference to the flow sheet 3,4-dichlorobutene-1, 1,4-dichlorobutene-2 or a mixture of these, is fed into the isomerisation vessel (A) where it is intimately contacted with approximately twice its volume of catalyst solution, e.g. 1100 parts of 17.5% by weight aqueous sodium chloride containing 125 parts of cuprous chloride, 200 parts glacial acetic acid and 250 parts of ammonium acetate at about 35° C. for ten minutes. The well dispersed two-phase mixture is then passed into the separator (B) where the two phases rapidly separate into layers, a residence time of five minutes being adequate. The isomerised dichlorobutene layer may be water-washed before feeding to the fractionation system (C). If only one of the dichlorobutene isomers is required, the other, either 3,4-dichlorobutene-1 or 1,4-dichlorobutene-2, is recycled after fractionation and blended with the feed entering the isomerisation vessel (A) the mixture then being isomerised as before. After separation the catalyst solution layer is returned to storage (D) where it is agitated for 2.3 hours in the presence of copper turnings, to reduce any cupric chloride formed to the cuprous state, before being recycled as an almost colourless solution to the isomerisation vessel (A). A nitrogen atmosphere is maintained throughout the system.

Recovery of copper from the used catalyst solution for return to the process is easily achieved by diverting a proportion of the recycled catalyst solution as a purge stream and basifying the purge stream with, for example, sodium hydroxide and separating and washing the precipitated "hydroxide." This may then be returned as such, or after treatment with hydrochloric acid, to the catalyst solution. 3.5 N sodium hydroxide solution may also be used instead of brine in the make-up catalyst mixture and so reduce the amount of purge necessary to maintain the recycled catalyst pH in the desired range.

The invention is further illustrated but not limited by the following example.

EXAMPLE

Employing a discontinuous process from which the continuous process described above was developed the following typical results were obtained using the specified process conditions.

| Ex. | Cuprous Chloride, parts by weight | Solvent for cuprous chloride Type | Parts by weight | Buffer Type | Parts by weight | Time, mins. | Temperature, °C. | Starting material Type | Parts by weight | Percent isomerisation | Percent recovery of wet dichlorobutene liquors | pH at completion of isomerisation |
|---|---|---|---|---|---|---|---|---|---|---|---|---|
| 1 | 2 | 17.5% sodium chloride. | 45 | None | | 30 | 40 | A | 25 | 79.8 | 79.5 | <1 |
| 2 | 2 | 20% ammonium chloride. | 43 | ----do---- | | 30 | 40 | A | 25 | 77.3 | 79.5 | <1 |
| 3 | 2 | 17.5% sodium chloride. | 45 | Ammonium acetate. | 15 | 30 | 40 | A | 25 | 79.0 | 100 | >4 |
| 4 | 1.5 | 20% ammonium chloride. | 32 | ----do---- | 5 | 30 | 40 | A | 25 | 81.9 | 88.5 | <1 |
| 5 | 1.5 | 17.5% sodium chloride. | 34 | Sodium acetate. | 15 | 30 | 40 | A | 25 | 69.8 | 100 | 4 |
| 6 | 1.5 | ----do---- | 34 | Ammonium acetate. | 5 | 30 | 40 | A | 25 | 80.7 | 94 | 2 |
| 7 | 1.5 | ----do---- | 34 | ----do---- | 15 | 30 | 40 | A | 25 | 81.0 | 100 | >4 |
| 8 | 2.0 | ----do---- | 34 | ----do---- | 15 | 30 | 40 | B | 25 | 11.8 | 97.7 | >4 |
| 9 | 2.0 | ----do---- | 34 | ----do---- | 15 | 30 | 40 | B | 25 | 9.5 | 97.7 | 4 |
| 10a | 5 | ----do---- | 45 | Ammonium acetate. / Acetic acid | 10 / 12 | 5 | 35 | A | 25 | 81 | | >4 |
| 10b | 5 | ----do---- | 45 | Ammonium acetate. / Acetic acid | 10 / 12 | 10 | 35 | A | 25 | 86 | | >4 |
| 11a | 4 | ----do---- | 45 | Ammonium acetate. / Acetic acid | 10 / 12 | 5 | 35 | A | 25 | 74 | | >4 |
| 11b | 4 | ----do---- | 45 | Ammonium acetate. / Acetic acid | 10 / 12 | 10 | 35 | A | 25 | 83 | | >4 |

A=3,4-dichlorobutene-1; B=1,4-dichlorobutene-2.

What we claim is:
1. A process for the isomerisation of dichlorobutene selected from the group consisting of 1,4-dichlorobutene-2, 3,4-dichlorobutene-1 and their mixtures wherein said dichlorobutene is contacted with an aqueous solution of an alkali metal halide or an ammonium halide or cupric halide containing a cuprous salt selected from the group consisting of cuprous chloride and cuprous bromide, the solution being maintained at a pH value from 3 to 7.3.

2. Process according to claim 1 wherein the aqueous solution contains sodium chloride, ammonium chloride or cupric chloride in an amount of from 10% to 45% by weight.

3. Process according to claim 1 wherein the cuprous salt is present in an amount of from 0.5% to 10% by weight of the aqueous solution.

4. Process according to claim 1 wherein the cuprous salt is cuprous chloride.

5. Process according to claim 1 wherein sodium acetate or ammonium acetate is present as a buffer salt.

6. Process according to claim 1 wherein the dichlorobutene is contacted in the liquid phase with the catlayst solution by dispersing the dichlorobutene in the form of fine liquid drops in the catalyst solution at from 20° C. to 60° C. and after a suitable period of contact conveniently from 10 minutes to 60 minutes separating the substantially immiscible dichlorobutene product from the aqueous solution.

7. Process according to claim 1 wherein oxygen is excluded so as to maintain the cuprous salt content of the catalyst in the reduced state.

8. A process for the isomerization of dichlorobutene selected from the group consisting of 1,4-dichlorobutene-2, 3,4-dichlorobutene-1 and their mixtures comprising contacting said dichlorobutene with an aqueous solution of a cuprous salt selected from the group consisting of cuprous chloride and cuprous bromide and a member selected from the group consisting of an alkali metal halide, and ammonium halide and cupric halide, and maintaining said solution at a pH value from 3 to 7.3 by addition of a member selected from the group consisting of soduim acetate, ammonium acetate, cupric acetate, sodium hydroxide, copper carbonate, hydrated copper oxide and mixtures thereof.

References Cited

UNITED STATES PATENTS

| | | | |
|---|---|---|---|
| 2,242,084 | 5/1941 | Nicodemus et al. | 260—654 |
| 2,446,475 | 8/1948 | Hearne et al. | 260—654 |
| 2,879,311 | 3/1959 | Hawkins | 260—654 |
| 2,911,450 | 11/1959 | Welton | 260—654 |

FOREIGN PATENTS

| | | |
|---|---|---|
| 460,149 | 10/1949 | Canada. |
| 798,889 | 7/1958 | Great Britain. |

LEON ZITVER, *Primary Examiner.*

K. V. ROCKEY, *Assistant Examiner.*